(Model.)
M. F. CONNETT.
MACHINE FOR MAKING WIRE AND PICKET FENCING.
No. 325,504. Patented Sept. 1, 1885.
8 Sheets—Sheet 1.
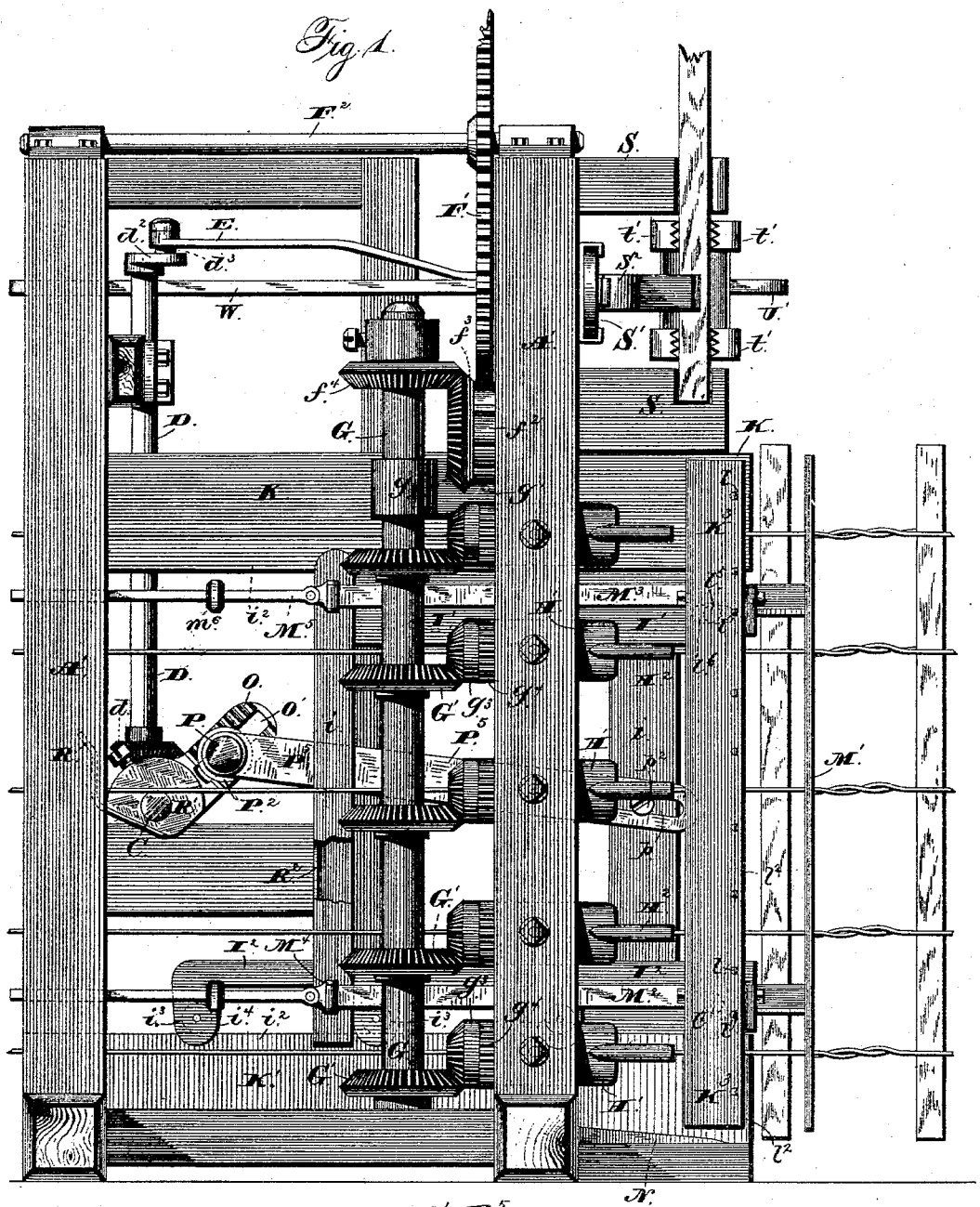
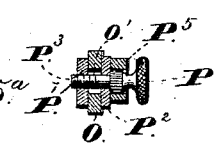
Witnesses:
Jas. E. Hutchinson.
Henry C. Hazard.
Inventor:
Matthew F. Connett
by Prindle and Russell
Attorneys

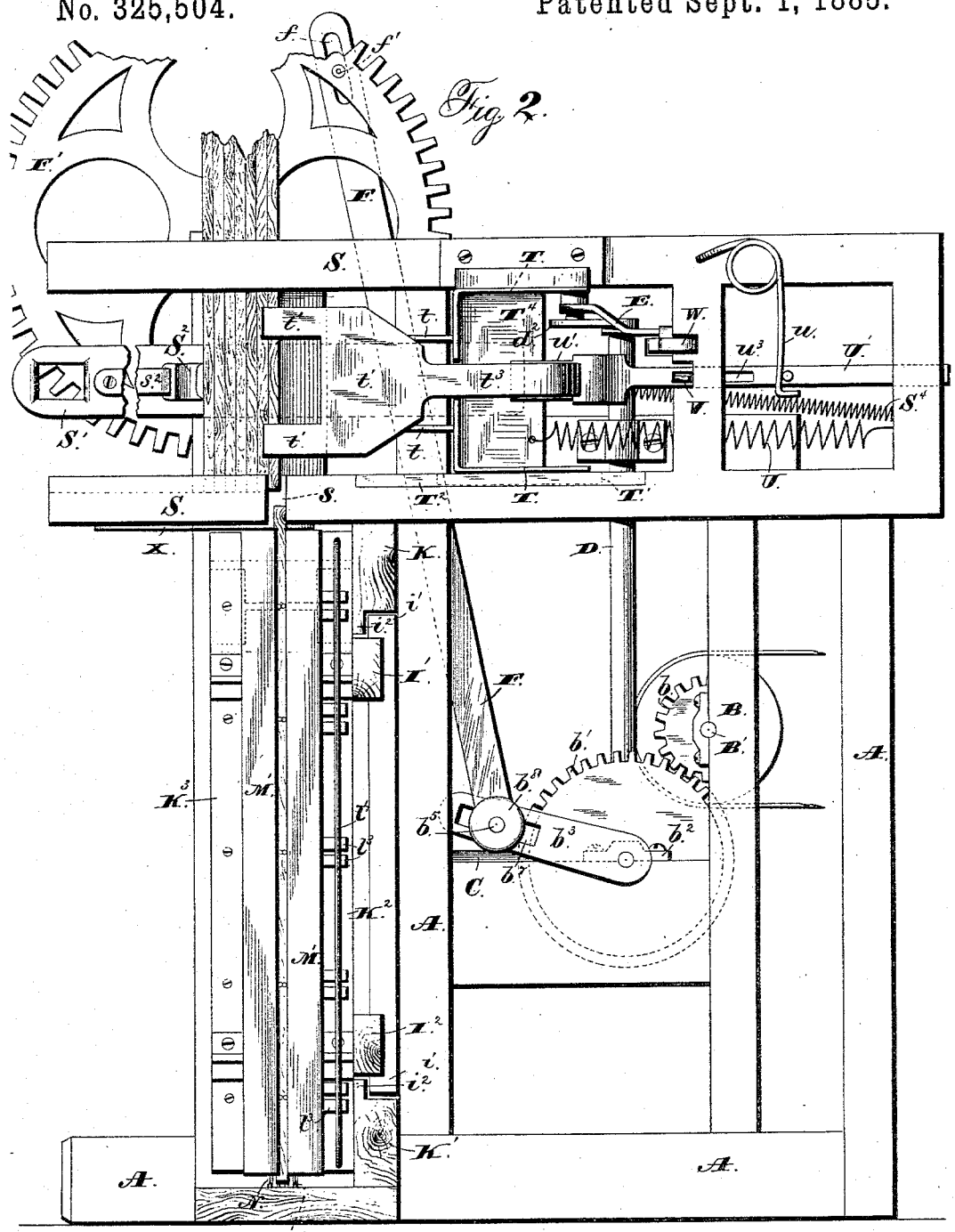

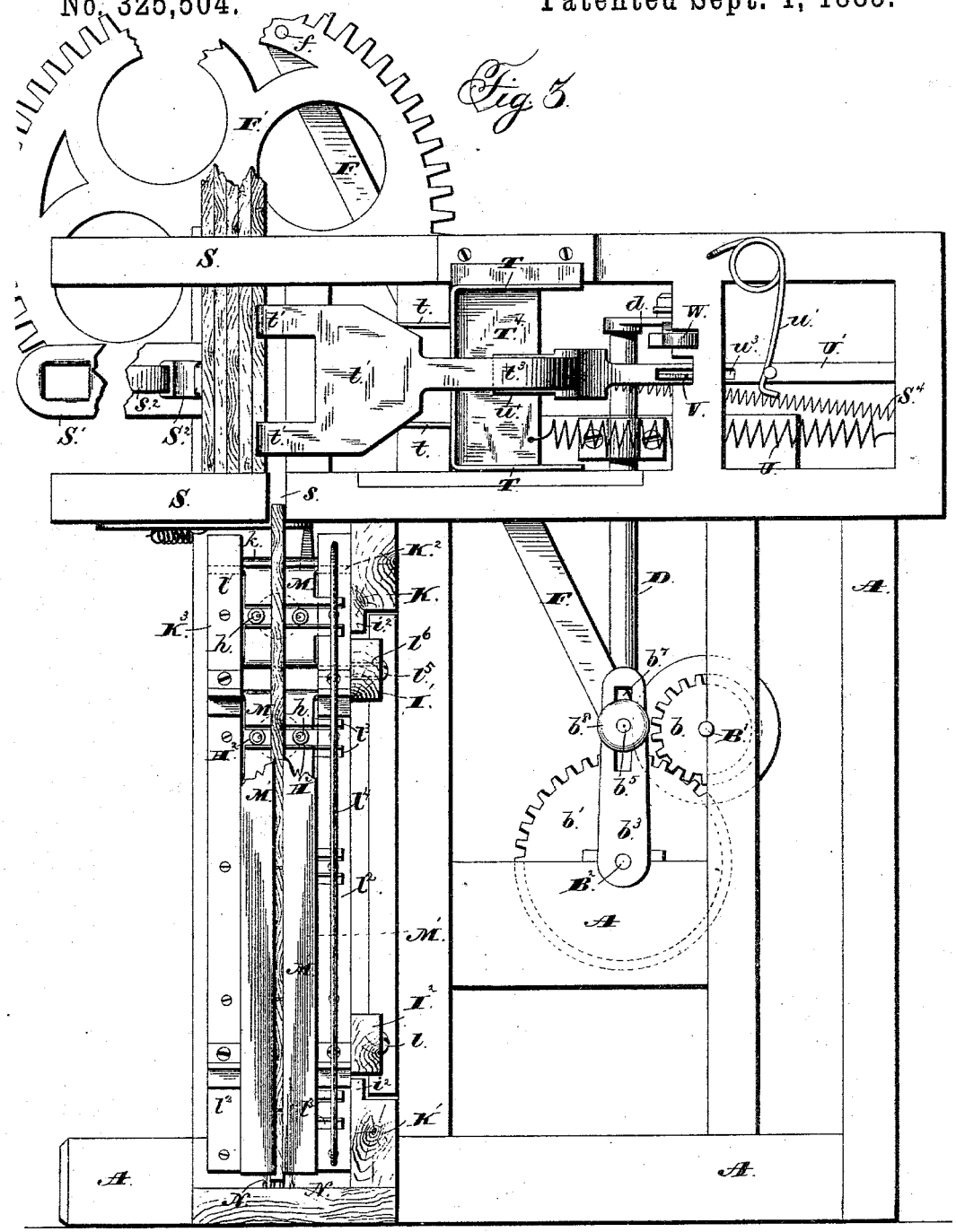

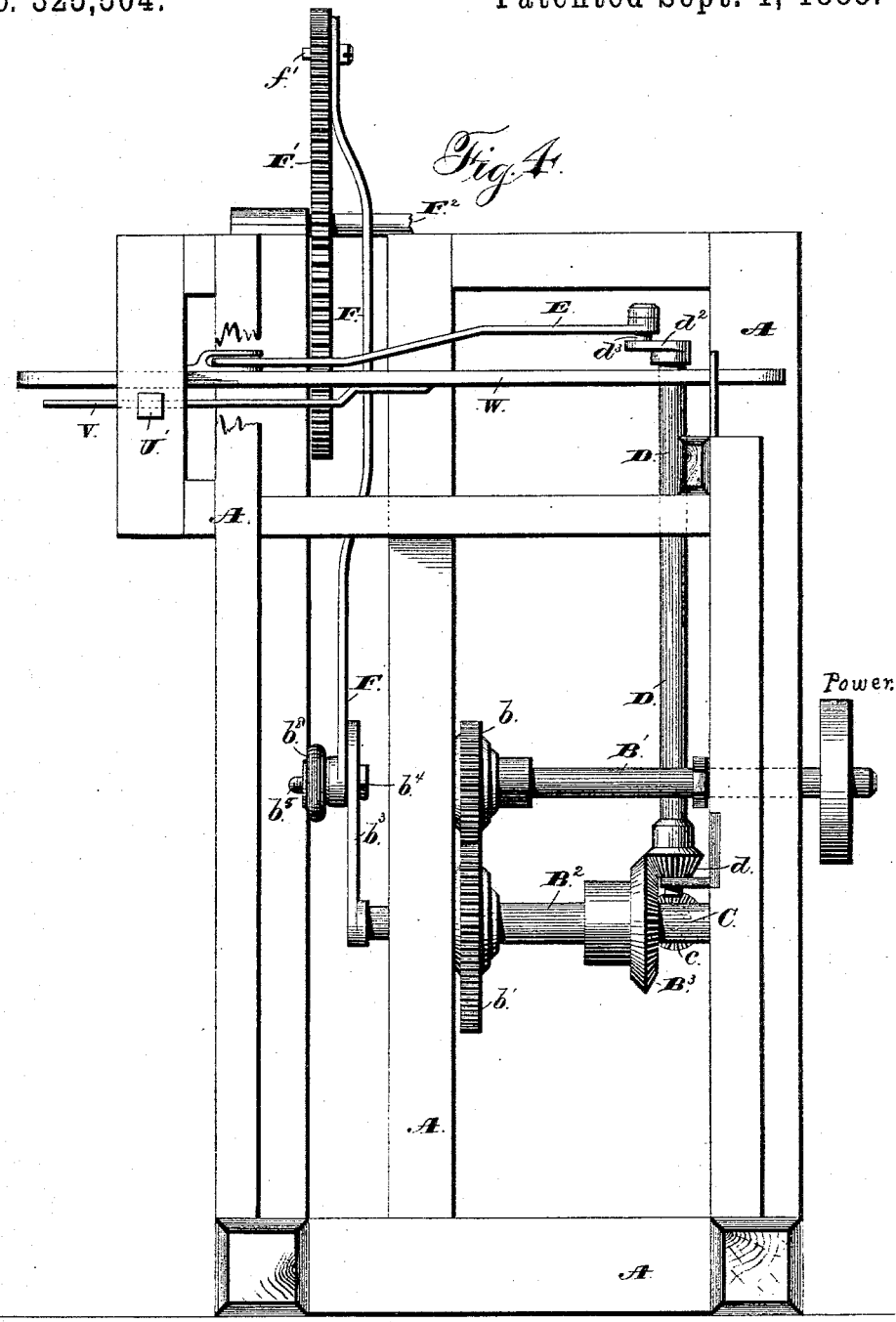

(Model.) 8 Sheets—Sheet 5.
M. F. CONNETT.
MACHINE FOR MAKING WIRE AND PICKET FENCING.
No. 325,504. Patented Sept. 1, 1885.
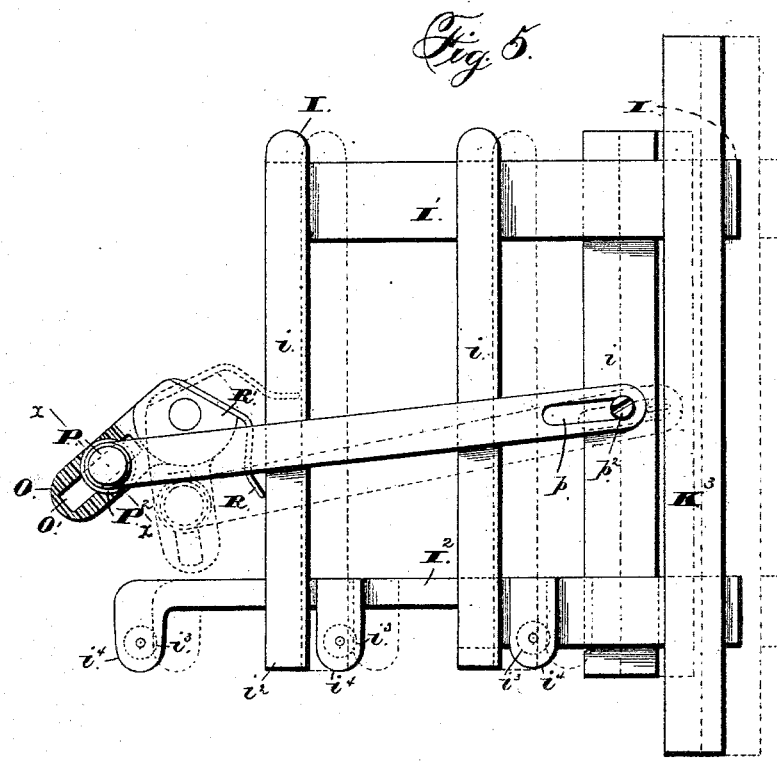
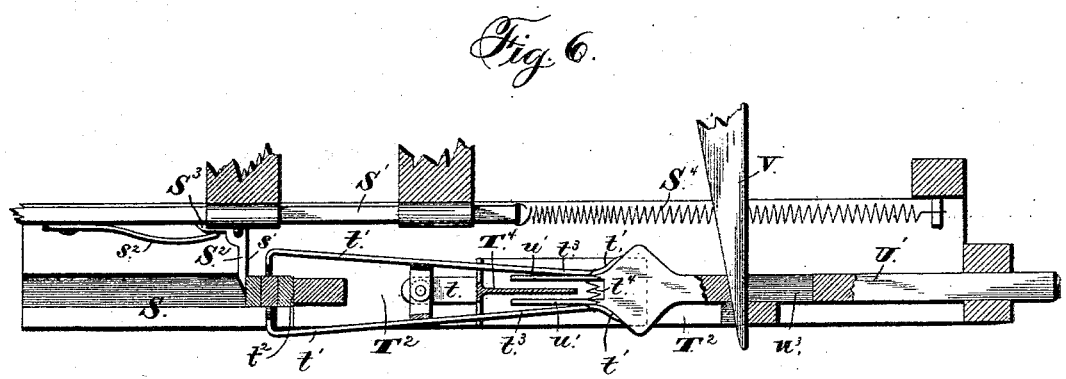

(Model.)

M. F. CONNETT.

MACHINE FOR MAKING WIRE AND PICKET FENCING.

No. 325,504. Patented Sept. 1, 1885.

8 Sheets—Sheet 6.

Witnesses:
Jas. E. Hutchinson.
Henry C. Hazard.

Inventor:
Matthew F. Connett
by Prindle and Russell
attorneys.

N. PETERS, Photo-Lithographer, Washington, D. C.

(Model.)

8 Sheets—Sheet 7.

M. F. CONNETT.
MACHINE FOR MAKING WIRE AND PICKET FENCING.

No. 325,504. Patented Sept. 1, 1885.

Witnesses:
Jas. E. Hutchinson
Henry C. Hazard

Inventor.
Matthew F. Connett
by Kindle and Russell
Attorneys.

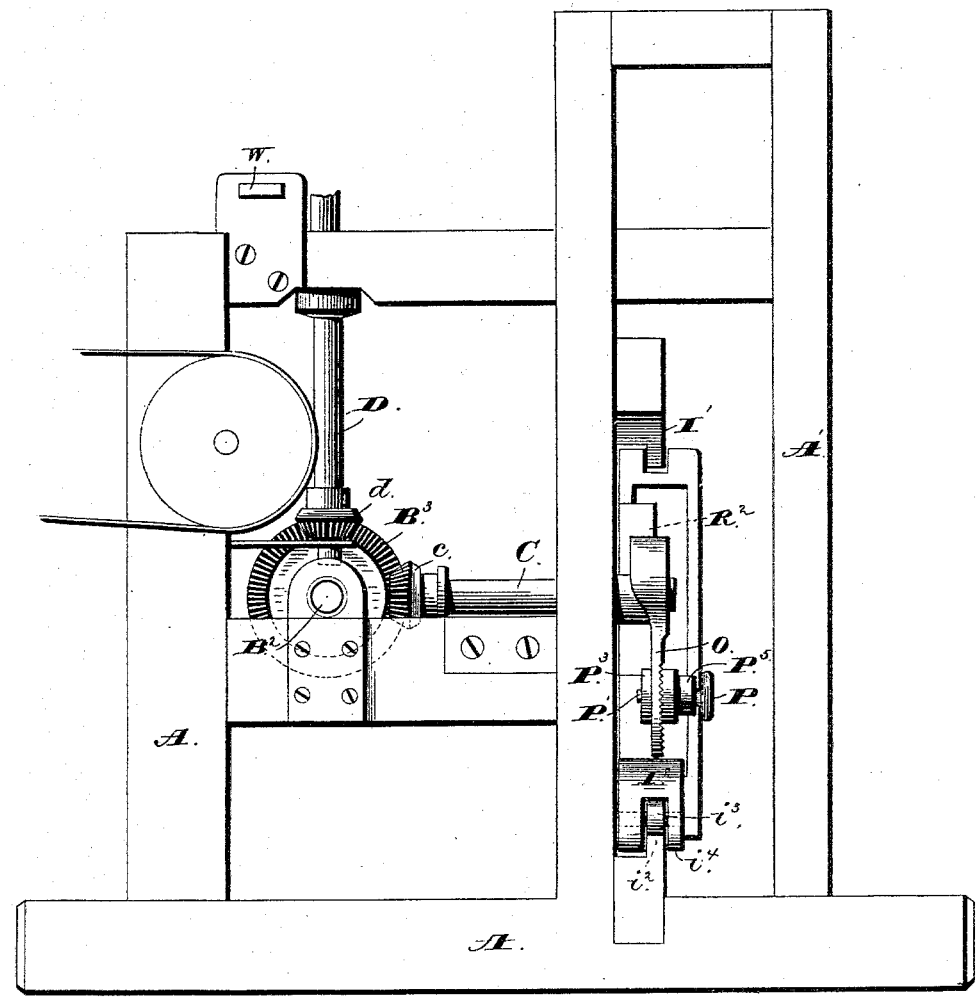

UNITED STATES PATENT OFFICE.

MATTHEW FRANKLIN CONNETT, OF SPRINGFIELD, ILLINOIS, ASSIGNOR OF TWO-THIRDS TO CHAS. A. ORR, OF SAME PLACE.

MACHINE FOR MAKING WIRE AND PICKET FENCING.

SPECIFICATION forming part of Letters Patent No. 325,504, dated September 1, 1885.

Application filed October 16, 1884. (Model.)

*To all whom it may concern:*

Be it known that I, MATTHEW F. CONNETT, of Springfield, in the county of Sangamon, and in the State of Illinois, have invented certain new and useful Improvements in Machines for Making Wire and Picket Fence; and I do hereby declare that the following is a full, clear, and exact description thereof, reference being had to the accompanying drawings, in which—

Figure 7:
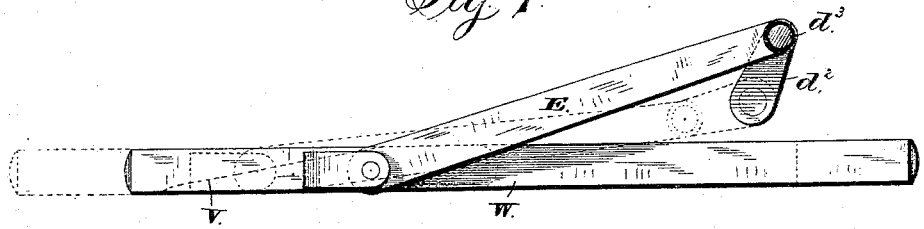
Figure 8:
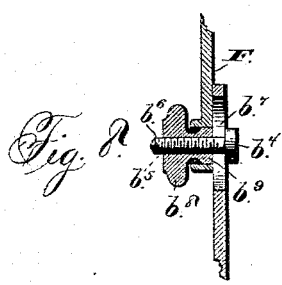
Figure 9:
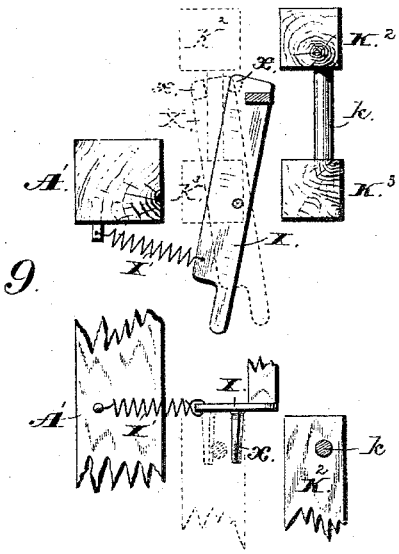
Figure 10:
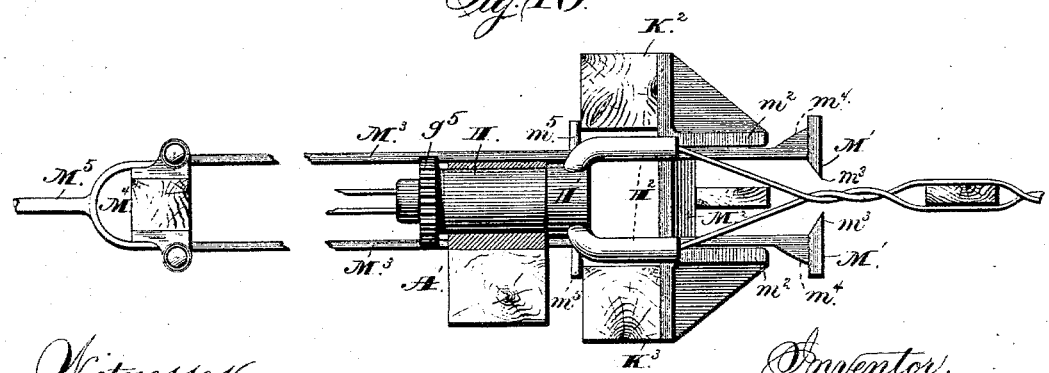
Figure 11:
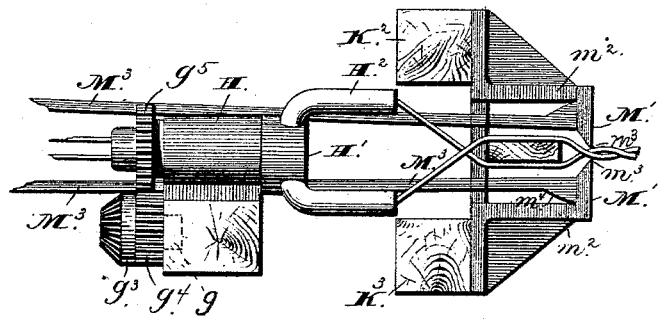
Figure 12:
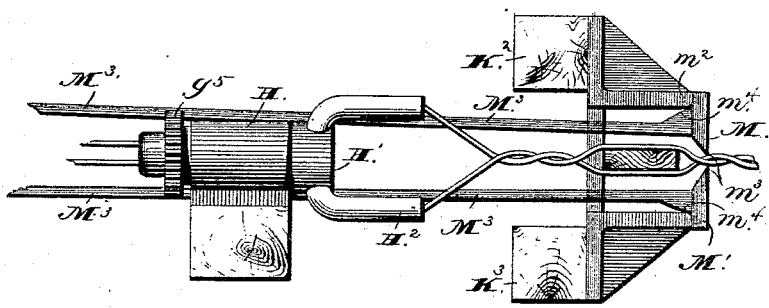
Figure 13:
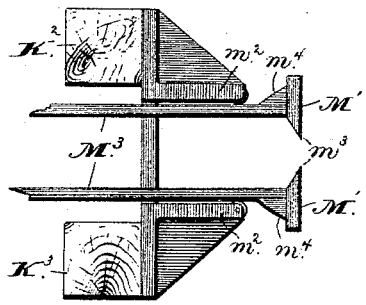

Figure 1 shows a front elevation of my machine with the parts as situated just as the twists in the wires behind the slat are being finished; Fig. 2, a side elevation of the same; Fig. 3, a similar view with the parts in position as when one of the slats is dropped into position between the wires; Fig. 4, a rear elevation of the machine; Fig. 5, a detail view in side elevation of the cam, adjustable crank-pin, and connecting-rod, and sliding gate operated thereby; Fig. 5$^a$, a sectional view on line $x\,x$ of Fig. 5; Fig. 6, a detail view showing the slat-holding rack with its feeding and dropping devices in position before a slat is dropped onto the movable stop; Fig. 7, a detail plan view showing the cam-bar for operating the slat or picket grasping jaws, and the means for operating it; Fig. 8, a detail view of the means for actuating the twister-driving gear-wheel; Fig. 9, a detail view showing the gate as actuating the stop to allow a slat to drop in place in front of it; Fig. 10, a detail plan view of the wire-gripping mechanism with the position as before the gate moves outward; Fig. 11, a similar view of the gripping mechanism after the gate has started on its outward movement; Fig. 12, a similar view of the mechanism when the gate has reached the limit of its outward movement; Fig. 13, a detail view of a modified form of gripper-operating arms on the gate provided with anti-friction rollers, and Fig. 14 is an elevation of the side opposite to that shown in Fig. 2.

Letters of like name and kind refer to like parts in each of the figures.

The object of my invention is to provide an improved machine for manufacturing fence out of lath-slats or pickets and wires; and to this end it consists in the machine, and in the construction, arrangement, and combination of parts, as hereinafter specified.

In the drawings, A designates the frame, which can be made of any form or material desired and found best to properly support the various parts of the machine.

Journaled and supported in suitable bearings, B, attached to the sides of two upright beams at the rear side of the machine-frame, is the main driving shaft B', which is to be driven by suitable connections with any desired source of power. Below and forward of this shaft is journaled another parallel shaft, B$^2$.

A small gear-wheel or pinion, $b$, on shaft B', near the end thereof opposite to that at which power is applied, meshes with and drives the gear-wheel $b'$ on the shaft B$^2$, close to its bearing $b^2$ on the frame beam. On the outer side of this bearing there is fastened upon the end of the shaft B$^2$ a slotted crank-arm, $b^3$. Upon this shaft, between its two bearings, is the bevel gear-wheel B$^3$, which meshes with and drives the bevel-pinion $c$ on the rear end of the horizontal forwardly-extending shaft C, journaled in a suitable bracket from one of the beams near its rear end, and near its forward end in a bearing on one of the frame-beams. This bevel gear-wheel B$^3$ also meshes with and drives the bevel-pinion $d$ on the lower end of the vertical shaft D, which at its lower end is journaled in a bearing in a bracket adapted to support it, and near its upper end in a suitable bearing attached to one of the frame beams. This shaft D extends above this upper bearing, and carries on its upper end a crank, $d^2$, provided with a suitable crank-pin or wrist-pin, $d^3$, upon which is journaled or pivoted one end of the connecting-bar E, for a purpose to be hereinafter set forth.

The slotted crank-arm $b^3$ is provided with an adjustable crank-pin, $b^4$, consisting of the pin $b^5$, whose head bears against the inner side of the crank, and whose screw-thread shank $b^6$ extends through the slot $b^7$ in the crank-arm, and the nut $b^8$, having the cylindrical shank $b^9$ screwed onto the shank $b^6$, and adapted, when screwed in place, to clamp the crank-arm on each side of the slot between its end and the head of the screw-pin $b^5$. With this construction the crank-pin $b^4$ can obviously be adjusted on the crank-arm to the extent of the slot and fixed at any adjustment.

Journaled or pivoted upon the cylindrical portion or shank of nut $b^8$ is the end of the connecting-bar F, which extends upward and forward, as shown. Its upper end is provided with the slot $f$, which engages the screw-pin $f'$ on the large gear-wheel F', fixed on the horizontal shaft $F^2$, journaled in suitable bearings at the front of the frame-top. This wheel, by the crank $b^3$ $b^4$, the connecting rod or bar F, the slot therein, and the pin on the wheel, is given a rotary reciprocating motion as the shaft $B^2$ revolves, sufficient to give the twisters, hereinafter described, the desired number of revolutions first in one direction and then in the other. There is a short period of rest at each end of the partial rotation of the wheel on account of the play of the slotted end of the bar with reference to the pin $f'$.

The wheel F' meshes with and drives the pinion $f^2$, which is attached to or cast in one piece with the bevel-pinion $f^3$, and is journaled on a horizontal stud on one of the vertical front frame-beams, A'. The bevel-teeth of this pinion mesh with the horizontal bevel gear-wheel $f^4$ on the upper end of the vertical shaft G, which near its upper end is journaled in a bearing, $g$, in a bracket, $g'$, and at its lower end in a vertical supporting-bearing on one of the bottom frame beams. Carried by this shaft is a series of bevel-pinions, G' G', equal in number to that of the twisters to be used.

Journaled on studs $g$ $g$ on the beam A' are the compound bevel and face pinions $g^3$ $g^4$, one for each twister desired. The bevel portion of each of these compound pinions gears with and is driven by one of the bevel-wheels G' G'.

Journaled in bearings $h$ $h$ on the rear side of beam A' are the twisters H H, each of which consists of the cylindrical hollow shank, through which the wires can pass, journaled in one of the bearings, provided on its inner end with a pinion, $g^5$, meshing with and driven by the face pinion $g^4$, and on its other end, outside of the bearing, with the hollow enlargement H', at the sides of which, and diametrically opposite each other, are the two tubular arms $H^2$ $H^2$, projecting outward from the end of the enlargement H' in directions parallel to the main cylindrical portion. The openings or bores $h$ $h$ of these arms communicate with the interior bore of the enlargement, so that the wires carried through the twister-shank can be passed out through these arms at a distance from each other sufficient for the slats or pickets to be dropped down freely between them when the twister is not being rotated so that its arms $H^2$ $H^2$ stand in the same horizontal plane.

The gearing and mechanism for driving the twisters, hereinbefore described, are so proportioned and arranged as to bring and leave the twisters at the end of each twisting operation in either direction with the arms $H^2$ $H^2$ of each one in the same horizontal plane, with the wires held, as described above, apart, so that the picket can be dropped vertically down between the wires of each pair.

To properly move each successive slat forward and outward after it has been dropped down, so as to stand vertically between the two wires issuing from the arms of each twister, I have provided a reciprocating gate, I, which is carried by and upon the forward ends of the upper and lower bars, I' $I^2$, to the front and rear sides of which are attached the ends of the bars $i$ $i$, which extend at their lower ends slightly below the bar $I^2$ and a little above the upper frame-bar, I'. The horizontal bars I' $I^2$, being joined together by the vertical bars $i$ $i$, as described, form a supporting-frame for the gate proper, I. These projecting ends $i'$ $i'$ embrace the upper and lower guide strips or flanges, $i^2$ $i^2$, projecting from the lower and upper sides, respectively, of the parallel beams K K', attached to the frame of the machine. These strips or flanges are preferably made of metal. The beams to which they are attached, or a part of which they are, are, as shown, horizontal, and in a plane parallel with but to the rear of the front of the machine.

The gate-frame bar $I^2$ is preferably provided on its under side with supporting-rollers $i^3$ $i^3$ $i^3$, pivoted on pins extending through ears or lugs $i^4$ $i^4$ $i^4$ on each side of the bar. These rollers run on the flange $i^2$ on the beam K', so as to support the gate-frame and make its reciprocation or sliding easy and with as little friction as possible.

The gate I is a frame which consists of the rear bar or plate, $K^2$, attached to bars I' $I^2$, the front bar or plate, $K^3$, attached to and supported from bar $K^2$ by the series of rods $k$ $k$, forming distance-pieces, as shown. The bars $K^2$ $K^3$ are vertical and parallel, and at a sufficient distance apart to allow of the free passage and rotation between them of the series of twisters, with their twisting-arms, when the gate is in its inward position, as shown in Fig. 3.

Pivoted on the outer side or face of the gate is the series of swinging slats or flaps M M. These are arranged in pairs opposite the end of each one of the twisters. Of these pairs the upper slat is pivoted at its upper edge and the lower at its lower edge by means of pins, or the ends $l$ $l$ of a wire or rod extending into bearings in the bars $K^2$ $K^3$. I do not limit myself to any particular form of bearing for these pins or wire, but show such pins or ends in notches or bearings $l'$ $l'$ in the bars, and held there by means of strips $l^2$ $l^2$. With this arrangement the upper and lower flap of each pair are free to swing upward and downward, respectively.

As shown in Fig. 3, when the gate is carried back, the arms of the twisters project through between the swinging flaps, forcing them outward. To limit their swing each flap is provided with a projecting ear or lug, $l^3$, which is adapted to strike the rear bar, $K^2$, and the rod $l^4$, attached at the bottom and top of the beam or bar, and extending up along and at a distance from such bar. The upper flaps of each pair, being swung out as shown in Fig. 3, serve to guide the picket or slat dropped in front of the gate and hold it in vertical position.

The rear bar or plate, $K^2$, of the gate I is attached to the upper sliding frame-bar, $I'$, by means of a screw, $l^5$, passing through slot $l^6$ in the bar $I'$ and into the plate $K^2$. The lower end of plate $K^2$ is attached to bar $I^2$ by means of screw $l^7$, as shown. With this construction the gate I can be adjusted, as desired, to stand vertically or to stand at an angle to a vertical line by loosening screw $l^5$ and swinging the gate on the bottom screw, $l^7$, as a pivot, and then tightening up screw $l^5$ again. At the bottom of the machine, in position for the lower end of a slat or picket to strike on as it is dropped into position before the gate, are the sharp-edged blades N N, with their edges turned upward. The heights of these blades are diminished toward their outer ends, so that the picket or slat can easily be pushed by the gate outward to carry its lower end off the edges of the blades. Pins could be used instead of blades; but I prefer the latter.

For properly sliding the gate in and out, on the forward end of shaft C is the crank-arm O, which is slotted, as shown at $O'$, and serrated on each side of the slot.

The adjustable crank-pin P consists of the screw-pin $P'$, passing through the serrated plate or washer $P^2$, engaging the serrations on the crank-arm and the slot in the arm, and tapped through the nut or screw-plate $P^3$, bearing against the rear face of the crank-arm. The pin P has a cylindrical portion, the shoulder at the end of which bears against the outer face of plate $P^2$.

On the cylindrical portion of the pin is pivoted the end of connecting bar $P^5$, which near its outer end is slotted at $p$, as shown. In this slot plays the screw-pin $p^2$. This bar extends outward and plays between the bars $i\ i$ of the gate-frame. This arrangement and construction allows the gate to remain stationary for a certain length of time at the inward and outward limits of its movement, while the crank revolves continuously.

To carry the slat or picket dropped in front of the gate out from between or out of reach of the arms of the twisters, a cam-arm, R, preferably a spring-arm, is so situated on the portion $R'$ of the crank which is attached to the shaft that it will, as the shaft revolves, strike a bearing-plate, $R^2$, on one of the gate-frame bars $i$ before the connecting rod or bar $P^5$ begins to act to carry the gate outward. After the gate is thus moved by the cam to take the picket clear of the twisters it has a short period of rest, sufficient to allow a half-twist to be made in the wires behind the picket. The object of making this pause in the advance movement of the gate is to make the wires hug the lath or picket tightly at each end of the twist and to spin out the wire in the middle, thus making a graduated twist. As the gate is carried outward, so that the twister-arms do not project through between the swinging flaps on the gate, said flaps are, by the pressure on the picket, pressed back to make a substantially continuous vertical face to push the picket outward while keeping it vertical. The amount of throw of the connecting-bar $P^5$ and the amount of movement of the gate can be nicely adjusted by adjusting the pin on the crank-arm. As the gate is moved outward and pushes the slat or picket before it against the twists previously made in the wires, the wires will of course be drawn out through the twisters in sufficient quantity for the new twists to be made behind such slat or picket.

Where the slats are of the same size or thickness at both ends the same amount of wires will be drawn out through the top and bottom twisters, and the pickets in the fence will consequently be substantially parallel; but where a picket happens to be larger or wider at one end than at the other the wires at the narrow end will not be pulled out equally with the wires at the wide end. If the wider end of the lath or picket be at the bottom of the fence, then the bottom wires of the fence will be longer than the wires at the top thereof, and consequently when the fence is put up it will be crooked and the laths or pickets will not be parallel to each other. One or two defective laths, which are not of the same width or size throughout their lengths, will make a bad defect in a length of fence. I do not then intend to rely upon the pickets themselves to determine the amount of wire to be drawn out as they are pushed forward or outward, but provide means adapted to draw out each for each twist an equal amount of wire from each twister. For this purpose I provide a reciprocating gripping mechanism, consisting of the vertical flat bars $M'\ M'$, situated in front of the gate-face, and having their opposing edges $m^3\ m^3$, between which the wires pass outward from the twisters, made sharp, as shown, so as to take a good hold of the twist in the wires when the bars are forced inward toward each other. Each of these gripper-bars $M'\ M'$ is carried and supported near its lower end by a bar, $M^2$, and near its upper end by a bar, $M^3$. The upper bars, $M^3\ M^3$, extend inward through the gate I, just below the upper twister, and at their inner ends are hinged on vertical pivots to the head $M^4$ on the end of rod $M^5$, which passes through and slides in a suitably-shaped hole through an upright beam of the frame. The lower bars, $M^2\ M^2$, carrying the lower ends of the gripper-bars, are in the same way, after passing in through the gate and just over the lowest twister, hinged to a similar head on another reciprocating rod, like rod $M^5$, and arranged in the same way. With this construction the bars $M^2\ M^2$ and $M^3\ M^3$ can obviously be swung apart or toward each other to separate the gripper-bars M' M' or bring them together to grip the wires, as shown in the drawings.

To make the jaws close upon the twisted wires at the proper time, I provide the face of the gate with the rigid arms or projections $m^2$ $m^2$, one close to the other side of one of the hinged bars $M^2$ $M^2$ $M^3$ $M^3$, and from the outer sides of such bars, just back of the gripper-bars, with inclined planes $m^4$ $m^4$, up over which the ends of rigid arms $m^2$ $m^2$ ride as the gate moves forward. By this the jaws are closed upon the twists in the wires during the first portion of the movement of the gate, and are held closed, so as to grip said twists. The jaws are then moved outward with the gate, and the wires will consequently be drawn out through the twisters.

When the gate is moved back, after the twists behind the new lath or picket are finished, the back of the gate strikes lugs $m^5$ $m^5$ on the jaw-carrying bars, after the rigid arms $m^2$ $m^2$ on the gate have passed off the inclined planes on the bars and left the jaws free to open and release the wires. By the engagement of the gate with these lugs the jaws will then be carried back into their first position, again ready to grasp the wire-twists in the proper places, as the gate again moves outward.

As shown in Fig. 13, the inner or engaging sides of the ends of rigid arms or projections $m^2$ $m^2$ can be provided, if desired, with anti-friction rollers for engaging the inclined planes on the jaw-carrying bars.

A stop, $m^6$, is placed on each reciprocating rod $M^5$, adapted to limit the inward travel of the rod.

A rack, S, on the upper portion of the machine serves to hold a number of slats or laths for pickets. The rear end of this rack, directly over the series of twisters, is provided with an opening, s, through its bottom. In ways at the inner side of the rack slides the feed-bar S'. This feed-bar has pivoted on its outer face the right-angled piece $S^2$, which is normally held with its long arm s' projecting out at right angles to the face of the bar in position to engage the laths or pickets in the rack by a spring, $s^2$, bearing against the short arm $S^3$ and holding it against the bar. Thus a spring-pawl is formed which, when the bar is pulled inward or rearward by spring $S^4$, will engage the pickets and carry them toward the opening s in the rack-bottom, but will yield and pass over the sides of said pickets when the bar is pulled outward.

Just beyond the rear or discharge end of the rack is the sliding frame T, which on its under side has a rib, T', sliding in ways $T^2$ $T^2$ on a beam forming a continuation of the lower rack-beam. On its upper end this frame is provided with lugs or flanges embracing a metal plate attached to the extension of the upper rack-beam. On the forward end of this sliding frame are the upper and lower forwardly-extending horizontal lugs t t, to which are pivoted the jaws t' t', which extend by and forward of the rear end, $t^2$, of the picket-rack, so that their toothed grasping portions are in position to grasp the picket next to the end one. The jaws are provided with the rearwardly-projecting arms or shanks $t^3$ $t^3$, which are normally pulled toward each other to open the jaws by a spring, $t^4$.

A spiral spring, U, serves to keep the frame T held back, as shown in Fig. 2. In rear of this frame, and sliding in suitable ways in the same vertical plane therewith, is the bar U', which at its forward end is formed with the two arms u' u', extending forward on each side of the middle or main plate, $T^4$, of the frame, and between such plate and the ends of the jaw-shanks. The bar U' is provided in rear of such jaw-shanks with a V-shaped cam on each side, which, when the bar is pushed forward, engage the ends of the jaw-shanks and spread them apart, thus forcing the engaging ends of the jaws inward. A spring, u, lighter and weaker than the spring U, serves to keep this bar retracted. With this construction, if the bar be pushed forward, it will, by means of its cams, close the jaws, and then, when its end between the arms u' u' strikes the main plate $T^4$ of the frame, it will carry the frame forward with jaws closed, as and for the purpose hereinafter described.

The bar is provided with a horizontal slot, $u^3$, in which plays, at right angles to the bar, the cam-plate V, attached to and carried by the reciprocating bar W, driven by the connecting-rod E, actuated by the crank $d^2$ $d^3$ on shaft D. This cam-plate, on its forward side, is made tapering down to a point at its outer end. The cam side thus formed, as the plate is thrust outward, engages the front end of the slot in bar U', and so forces said bar outward and forward.

The lower end of the discharge-opening s from the rack is kept normally closed by a pivoted horizontally-swinging plate, X, normally kept in position to close the opening by means of a spring, X'. This stop-plate is swung back out of the way to leave said opening clear by a portion of the gate striking a lug, x, on it as said gate reaches the inward limit of its movement, as shown in Fig. 3.

I have not described or shown any means of reeling or winding up the fence as made, or of supplying the wires to the twisters, as any of the well-known forms of devices for such purposes can be used.

The vertical shaft D and the horizontal one, C, have the bevel-pinions on their ends meshing with the bevel gear-wheel on shaft $B^2$ so proportioned with relation to such wheel that each of these shafts revolves twice for every single revolution of shaft $B^2$. This is because each half-revolution of shaft $B^2$ serves, through its crank and connecting-rod, to revolve the large gear-wheel for driving the twisters a sufficient distance to give said twisters the requisite number of turns.

As usual in fence-machines, the twists in the wires are made first in one direction and then in another as successive pickets are fastened in place.

The operation of my machine, the parts being in position as shown in Fig. 1, and the rack being supplied with pickets or laths pressed forward against the rear end of the rack by the spring feed-bar pressing with its finger or pawl against the outer or front end of the series of pickets, is as follows: The driving-shaft being caused to rotate by any desired power, the gate is drawn inward toward a position under the rack and the jaw-operating cam-bar V is carried forward. The result of such movement of the bar is, that the jaws are first forced together to grasp the picket next to the one over the rack discharge-opening, and then the jaw-frame and jaws are carried forward to force the laths or pickets in the rack outward away from the picket over the opening. Being no longer held between the next picket of the series and the end of the rack, said picket drops freely down and rests on the swinging stop, closing the discharge-opening. As the gate I reaches the limit of its inward motion, a portion of it strikes the lug on the spring-held stop and swings such stop back to release the picket or slat, which immediately drops down along the face of the gate between the wires issuing from the twister-arms. These arms project slightly beyond the face of the gate, which is made, as described, of hinged flaps, passing between and swinging outward the flaps of each pair. The upper flaps of the pairs, being thus swung outward, serve to properly guide the slat as it slides down, so that its fall is free and it does not strike the upper edges of the lower flaps. The slat as it falls strikes at its lower end on the edges of the blades provided therefor, so that it shall not rebound. Its position is in the rear of the twists in the wires and between the ends of the twister-arms. It must then be moved forward to carry it beyond such arms before the twisters begin to revolve. During each period of rest of the twister-driving gear, before the pin on the large gear-wheel is engaged by either end of the slot in the connecting rod or bar for moving it with the pin on the wheel, the gate is given a short movement outward to clear the slat from the twisters by the cam-arm on shaft C engaging the plate on the gate-frame. As shaft C continues to revolve, the gate remains stationary for a period long enough to allow of half a twist being made in the wires behind the picket by the twisters, which begin to revolve just after the first movement of the gate. As the gate begins to move outward or forward, the gripping-jaws M' M' are closed on the twists in the wires between them by the projections or arms on the gate riding up on the inclined planes or portions on the outer sides of the jaw-carrying bars. The wires are then gripped firmly by the jaws, and as the latter are carried outward by the continued movement of the gate the wires will necessarily be pulled out through the twisters, all the pairs of wires being drawn out an equal amount, so that the wires at the top and at the bottom of the fence will be of the same length, and the pickets in the completed fence will then always be parallel. As the gate is drawn inward, the projections or arms on its face pass inward off the inclined planes on the jaw carrying bars and release the jaws, so that they can be easily drawn inward over the wires by the continued inward or backing movement of the gate. Meantime the cam bar or rod which operates the jaw-actuating cam-bar is retracted, and the jaw-carrying frame is retracted by its spring and the jaws allowed to open again, the cams passing rearward out from between the jaw-shanks. The spring feed-bar then forces the series of slats or pickets back, so that the rear one is held by friction between it and the next slat and the back end of the rack. As the gate is moved outward, as described above, the swinging stop is swung by its spring under the lower end of the discharge-opening to close the same and be in position to support the next picket when allowed to drop down onto it. As shaft C continues to revolve and the twister-driving gear-wheel is actuated in one direction or the other, the inner end of the slot in the connecting-rod from the crank on the shaft strikes the pin or screw on the gate-frame and carries it farther out, pushing the picket before it the required distance while the twists are being made behind it.

The distance to which the gate will be moved can be easily and nicely adjusted by adjusting the crank-pin on the crank, as described hereinbefore.

During the next rest of the twister-pinion-driving gear-wheel the gate is by the mechanism described herein pulled back to cause another slat to drop in front of it and to carry such slat out beyond the twister-arms, the feed-bar and jaw acting as before.

The extent of revolution of the twister gear-wheel can be adjusted by adjusting the pin on the crank of the counter-shaft.

Having thus described my invention, what I claim is—

1. In a fence-machine, the means for pushing each successive slat out into place between the wires, which consists in the vertical gate, in combination with a crank and connecting-bar operated by suitable gearing, and adjustable connections between the crank and bar, whereby the throw of the bar and gate can be adjusted, substantially as shown and described.

2. In a fence-machine, in combination with the gate for pushing each successive slat out into place behind the twists in the wires, mechanism for actuating the gate, and adjustable connections between the gate and actuating mechanism, whereby the gate can be adjusted so that its face shall be at any desired angle to the lines of the wires, substantially as and for the purpose described.

3. In a fence-machine, the vertical gate for pushing the successive slats forward into position between the wires, adjustably attached to its moving frame, so as to be capable of adjustment to vary the angle of its face with reference to the lines of the wires, substantially as and for the purpose described.

4. In a fence-machine, the reciprocating gate for moving each successive slat or picket forward into place between the wires, attached to its moving frame by means adapted to allow of its adjustment with reference to the lines of the wires, substantially as shown and described.

5. In a fence-machine, the reciprocating gate for pushing forward each successive slat into place between its wires, in combination with the sliding frame, the screw attaching one end of the gate to one of the frame-bars, and a screw passing through a slot in the other frame-bar and into the gate, substantially as and for the purpose described.

6. In combination with the reciprocating gate, in front of which the slats are successively dropped, the sliding frame, the revolving crank, the connecting-rod pivoted at one end on the crank-pin and at the other provided with a slot, and the pin or stud on the sliding frame engaging such slot, substantially as and for the purpose described.

7. In a wire-fence machine, in combination with the reciprocating gate, means, substantially as described, adapted to move the gate forward or outward beyond the twisters to carry a slat clear of the twisters before they begin to revolve, and means, substantially as described, to move the gate farther outward and to return it again inward into position to receive another slat, substantially as and for the purpose described.

8. In combination with the twisters and the gate and its frame sliding on suitable ways, and means for dropping a slat for a picket down between the ends of the twister-arms in front of the gate as it reaches the inward limit of its movement, the pin or stud on the gate-frame, the connecting-rod provided at one end with a slot engaging such pin or stud and at the other connected with a revolving crank, the cam revolving with the crank and adapted to move the frame and gate outward to clear the twister-arms before the inner end of the slot in the connecting-rod engages the pin or stud on the gate-frame, substantially as and for the purpose described.

9. In combination with the sliding frame and the gate carried thereby, the connecting-rod, the pin on the frame engaged by the rod, the revolving crank, and the adjustable pin on the crank on which is pivoted the rod end, substantially as and for the purpose described.

10. In a fence-machine, the means for preventing the rebounding of the slat or picket as it is fed into place between the wires, which consists of one or more sharp-edged blades adapted to receive the end of the slat or picket, substantially as shown and described.

11. In a fence-machine in which the slats or pickets are dropped into place between the wires to be twisted behind them, the means for preventing rebounding of the slats, which consists in one or more sharp-edged blades placed in position to receive the lower end of each slat as it is dropped into place, substantially as shown and described.

12. In a fence-machine in which the slats or pickets are dropped into place between the wires, in combination with the gate for carrying the slats or pickets outward after being dropped between the wires, means for supporting a picket until the gate has passed inward beyond the line of fall of the slat, constructed and arranged to be operated by the gate to release the slat, substantially as and for the purpose described.

13. In a fence-machine, in combination with the swinging stop kept by a spring normally in position to close the opening through which the slats are dropped into position between the wires, the reciprocating vertical gate for carrying the slats outward after being dropped into position, adapted to operate the stop to drop the picket or slat supported by it as the gate passes inward beyond the line of fall of the slat, substantially as and for the purpose described.

14. In combination with the rack for holding the pickets or slats in a vertical position, provided with a discharge-opening and means for forcing the pickets against the end of the rack and over the opening, the stop normally closing such discharge-opening, means for forcing back all the slats but the one over the opening to allow it to drop onto the stop, and means for actuating the stop at the proper time, substantially as and for the purpose described.

15. In combination with the rack for holding the pickets, the sliding bar provided with the pivoted right-angled piece having the long arm standing out at right angles to the bar, adapted to engage the outer or front picket, and the short arm resting against said bar, to hold the long arm from swinging back, in combination with the spring engaging such short arm and tending to keep it against the bar, and the spring adapted to cause the bar to force the pickets forward in the rack, substantially as shown and described.

16. In combination with the picket-rack constructed to hold a series of pickets or slats in an upright position, provided with means for forcing them toward and against the rear end of the rack, and with a discharge-opening through the rear end of the rack-bottom, the spring-actuated stop closing such opening, means for grasping the slat next to the one over the opening and forcing it with the rest of the series back to release the rear slat and allow it to drop onto the stop, and means for operating the stop to cause it to release the slat at the proper time, substantially as and for the purpose described.

17. In combination with the picket-rack adapted to hold a series of picket-slats in an upright position and provided at its end with a discharge-opening, means for forcing the pickets along against the rack end, a sliding frame beyond such end provided with jaws projecting on each side of and beyond the rack end and the picket against it, and constructed for engagement with the next picket, in combination with means for closing the jaws to grasp that picket and then moving the frame and jaws to force the rest of the pickets away from the one at the rack end, the stop closing the lower end of the discharge-opening, and means for moving the stop to unclose the opening at the proper time, substantially as and for the purpose described.

18. In combination with the sliding frame carrying pivoted jaws adapted to engage the picket next to the one at the discharge end, a spring to keep the jaws normally open, a spring adapted to keep them normally pulled back, a sliding bar provided with cams adapted to engage and spread apart the jaw-shanks to close the jaws, and with a shoulder or squared portion to come in contact with and push the frame forward after the cams have acted to spread the jaw-shanks, and means for actuating the cam-bar, substantially as and for the purpose set forth.

19. In combination with the sliding frame carrying the pivoted jaws, the reciprocating cam-bar adapted to close the jaws and slide the frame forward, provided with a longitudinal slot, and the bar reciprocating at right angles to the cam-bar and provided with a cam-plate adapted to pass through the slot and engage the end thereof to advance the cam-bar, substantially as and for the purpose set forth.

20. In a fence-machine, in combination with the twisters and the jaws constructed and arranged to grip all the wires forward of the twisters, means for operating the jaws and for moving them outward and forward to draw out the wires, substantially as and for the purpose described.

21. In a fence-machine, in combination with the means for pushing each slat forward into place between the wires, means for grasping the several pairs of wires and pulling them forward an equal amount for each twist, substantially as and for the purpose described.

22. In combination with the twisters and the reciprocating gate for pushing forward each successive slat inserted between the wires, gripping-jaws operated through suitable connecting means to close on the wires in front of the slat and pull the wires out through the twisters as the gate moves outward, substantially as and for the purpose described.

23. In a fence-machine, in combination with the twisters and the reciprocating gate for pushing forward each slat as it is inserted between the wires, the jaws extending on each side of the series of wires in front of the slat, carried on bars extending inward through the gate and between the twisters and at their inner ends hinged to a head on a sliding bar, and the projecting arms on the gate adapted to engage inclined projecting portions on the outer side of the jaw-carrying bars to close the jaws as the gate moves forward, substantially as and for the purpose described.

In testimony that I claim the foregoing I have hereunto set my hand this 5th day of September, 1884.

MATTHEW FRANKLIN CONNETT.

Witnesses:
I. K. BRADLEY,
WM. D. CARPENTER.